United States Patent [19]

Gupta et al.

[11] 4,419,416
[45] Dec. 6, 1983

[54] OVERLAY COATINGS FOR SUPERALLOYS

[75] Inventors: Dinesh K. Gupta, Vernon; David S. Duvall, Cobalt, both of Conn.

[73] Assignee: United Technologies Corporation, Hartford, Conn.

[21] Appl. No.: 289,952

[22] Filed: Aug. 5, 1981

[51] Int. Cl.³ .............................................. B32B 15/00
[52] U.S. Cl. ..................................... 428/656; 428/629; 428/678
[58] Field of Search ............... 428/629, 632, 633, 656, 428/678-685

[56] References Cited

U.S. PATENT DOCUMENTS

| | | | |
|---|---|---|---|
| 4,034,142 | 7/1977 | Hecht | 428/678 |
| 4,054,723 | 10/1977 | Higginbotham et al. | 428/680 |
| 4,078,922 | 3/1978 | Magyar et al. | 75/171 |
| 4,094,673 | 6/1978 | Erickson et al. | 420/437 |
| 4,109,061 | 8/1978 | Beale et al. | 428/685 |
| 4,123,595 | 10/1978 | Chang | 428/678 |
| 4,326,011 | 4/1982 | Goebel et al. | 428/680 |

FOREIGN PATENT DOCUMENTS 25263 3/1981 European Pat. Off. ............ 428/680

Primary Examiner—Michael L. Lewis
Attorney, Agent, or Firm—Charles E. Sohl

[57] ABSTRACT

Improved coating compositions are described for the protection of superalloys at elevated temperatures. The coatings are of the MCrAlY type where M is nickel or cobalt and are significantly improved by the addition of from 0.1-7% silicon and 0.1-2% hafnium. Coatings of the invention are preferably applied by plasma spraying and as so applied are found to be substantially more effective than prior art coatings.

6 Claims, 1 Drawing Figure

OVERLAY COATINGS FOR SUPERALLOYS

DESCRIPTION

1. Technical Field

Overlay coatings of the MCrAlY type are improved in their resistance to oxidation and corrosion by the addition of small but significant amounts of Si and Hf. The coatings are preferably applied by plasma spraying.

2. Background Art

Protective coatings are essential to the satisfactory performance of gas turbine engines. In particular, in the turbine section of an engine various components must withstand high stress while enduring a corrosive gas stream whose temperatures may be as great as 2500° F. As demands for efficiency and performance increase, the requirements for coating durability increase.

The most effective coatings for protecting superalloy turbine components are those known as MCrAlY coatings where M is selected from the group consisting of iron, nickel, cobalt and certain mixtures thereof. Such coatings are also referred to as overlay coatings because they are put down in a predetermined composition and do not interact significantly with the substrate during the deposition process. U.S. Pat. No. 3,528,861 describes a FeCrAlY coating as does U.S. Pat. No. 3,542,530. U.S. Pat. No. 3,649,225 describes a composite coating in which a layer of chromium is applied to a substrate prior to the deposition of a MCrAlY coating. U.S. Pat. No. 3,676,085 describes a CoCrAlY overlay coating while U.S. Pat. No. 3,754,903 describes a NiCrAlY overlay coating. U.S. Pat. No. 3,928,026 describes a NiCoCrAlY overlay coating having particularly high ductility.

A variety of alloying additions have been proposed for use with the MCrAlY compositions. U.S. Pat. No. 3,918,139 describes the addition of from 3 to 12% of a noble metal. U.S. Pat. No. 4,034,142 describes the addition of from 0.5 to 7% silicon to a MCrAlY coating composition. Finally, U.S. Pat. No. 3,993,454 describes an overlay coating of the MCrAlHf type.

U.S. Pat. No. 4,078,922 describes a cobalt base structural alloy which derives improved oxidation resistance by virtue of the presence of a combination of hafnium and yttrium.

DISCLOSURE OF INVENTION

The overlay coating compositions of the present invention have the following broad composition ranges: 5–35% Cr, 8–35% Al, 0.0–2% Y, 0.1–7% Si, 0.1–2% Hf balance selected from the group consisting of Ni, Co and mixtures thereof. The addition of Si and Hf in these levels provides about three to four times the life in an oxidizing environment than a similar coating without these additions. Similar improvements are observed in hot corrosion performance. The invention coatings are advantageously applied using fine powder applied by a plasma spray process. Coatings of the present invention have broad application in the field of gas turbines. Other features and advantages will be apparent from the specification and claims and from the accompanying drawings which illustrate an embodiment of the invention.

BEST MODE FOR CARRYING OUT THE INVENTION

Figure 1:
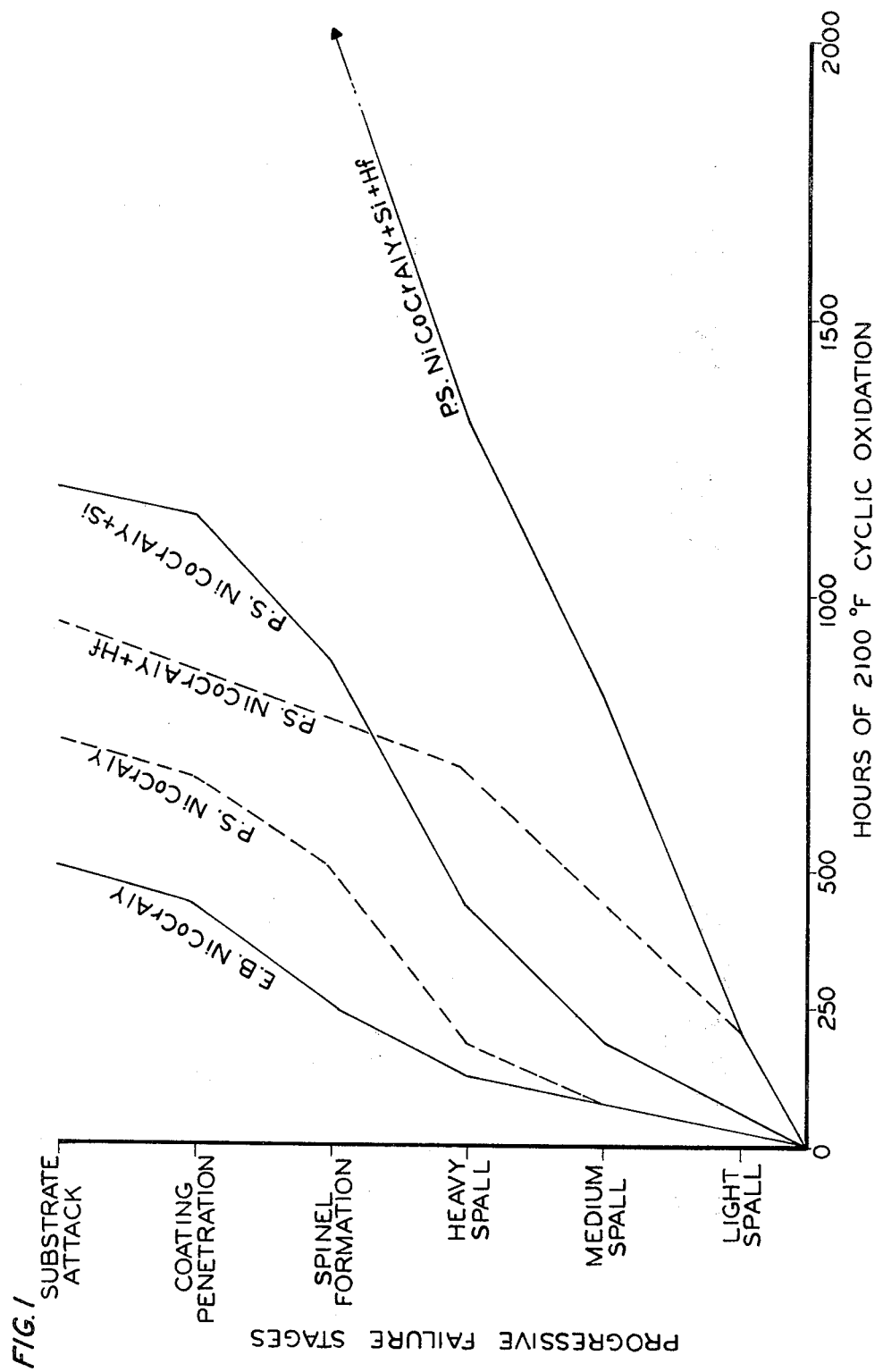
FIG. 1 shows the cyclic oxidation behavior of several coatings including the coating of the present invention.

The coating on the present invention derives substantially improved properties as a result of the addition of small amounts of silicon and hafnium to MCrAlY type coatings. The composition ranges of the present invention are presented in Table I. The Preferred A coating is most suited for use on nickel base substrates. The Preferred B coating is a refinement of the Preferred A coating which has been optimized for ductility. The Preferred C coating is most suited for use on cobalt base substrates.

Silicon may be added in amounts from 0.1 to 7 weight percent, however, for applications where temperatures in excess of 2100° F. are anticipated, silicon should be limited to a maximum of 2% to reduce the possibility of incipient melting. Hafnium is added in amounts from 0.1 to 2 weight percent. For use on substrate alloys which do not contain hafnium, it is preferred that the hafnium addition be at least 0.2%.

Additions of silicon and hafnium alone to MCrAlY coatings have previously been shown to provide improved properties. However, it is surprising and unexpected that the combination of minor additions of hafnium and silicon together produce a substantially greater improvement than that which would be predicted from benefits obtained from additions of either hafnium or silicon alone.

Yttrium may be replaced by any of the oxygen active elements found in Group IIIB of the periodic table including the lanthanides and actinides and mixtures thereof but yttrium is preferred.

TABLE 1

|  | BROAD | PRE-FERRED A | PRE-FERRED B | PRE-FERRED C |
|---|---|---|---|---|
| Cr | 5–40 | 15–25 | 15–25 | 15–35 |
| Al | 8–35 | 10–20 | 10–20 | 10–20 |
| Y | .0–2.0 | .1–2.0 | .1–2.0 | .1–2.0 |
| Si | .1–7.0 | .1–7.0 | .1–7.0 | .1–7.0 |
| Hf | .1–2.0 | .1–2.0 | .1–2.0 | .1–2.0 |
| Co | — | 0–30 | 15–25 | Balance |
| Ni | — | Balance | Balance | 0–30% |
| Ni + Co | Balance | — | — | — |

The effects of various compositional additions on the cyclic oxidation behavior of NiCoCrAlY material are illustrated in FIG. 1. All of the coatings referred to in the figure were tested on single crystal substrates of an alloy which nominally contains 10% Cr, 5% Co, 4% W, 1.5% Ti, 12% Ta, 5% Al, balance nickel. This alloy is described in U.S. Pat. No. 4,209,348. With the exception of the sample EB-NiCoCrAlY, which was prepared by electron beam physical vapor disposition, all the samples were coated using a low pressure chamber plasma spray technique which will be described below. The testing was performed using a flame produced by the combustion of jet fuel and the testing apparatus was arranged so that the samples were heated at 2100° F. for 55 minutes and then forced air cooled in a period of five minutes to a temperature of about 400° F.

The ordinate of the FIG. 1 graph lists the steps through which a coating progresses (degrades) during testing (or engine service).

The NiCoCrAlY type of coating derives its protective capabilities as a result of the formation of a thin uniform layer of alumina on the surface of the coating. This alumina film forms as a result of the oxidation of aluminum in the coating. With continued exposure to oxidizing conditions at elevated temperatures the alumina layer continues to grow in thickness and eventually spalls off. The spallation is accentuated by thermal cycling. The alumina layer re-forms after spallation provided that sufficient aluminum remains in the coating composition. Yttrium and other oxygen active elements such as hafnium inhibit spallation of this alumina scale, thus retarding the consumption of aluminum from these coatings. As yttrium and other oxygen active elements are consumed with increasing exposure time, the degree of spallation increases from light to medium and finally to heavy as shown on the figure. After repeated spallation and alumina reformation, the aluminum content of the coating is depleted to a level which is insufficient to re-form the alumina layer. At this point a non-protective complex oxide known as a spinel forms. The spinel is a compound containing nickel and/or cobalt and/or chromium in combination with aluminum and oxygen. The spinel has a distinct blue color and is readily apparent. Once the spinel forms, the oxidation rate of attack to the coating increases and it is soon penetrated; thereafter, significant substrate attack occurs. The coatings shown in FIG. 1 are described in Table 2 below.

TABLE 2

|    | E.B. NiCoCrAly | P.S. NiCoCrAlY | P.S. NiCoCrAlY +Si | P.S. NiCoCrAlY +Hf | P.S. NiCoCrAlY +Si +Hf |
|----|----|----|----|----|----|
| Cr | 18 | 18 | 18 | 18 | 18 |
| Co | 23 | 23 | 22 | 23 | 22 |
| Al | 12.5 | 12.5 | 12 | 12.5 | 12 |
| Y  | .3 | .4 | .4 | .4 | .4 |
| Ni | Balance | Balance | Balance | Balance | Balance |
| Si | — | — | 1.6 | — | .6 |
| Hf | — | — | — | .9 | .7 |

E.B = Electron Beam Physical Vapor Deposition
P.S. = Plasma Sprayed

The electron beam (E.B.) physical vapor deposition coating is currently the state of the art turbine airfoil coating and is widely used in commercial engines. It can be seen that under the severe test conditions employed, the life of the E.B. coating was somewhat less than 500 hours. The same coating composition applied by a low pressure plasma spray (P.S.) technique displays improved durability with a life of about 700 hours. The reason for this improvement is not completely understood and may be the result of the interaction of the specific coating and substrate employed.

Modifying the basic coating composition with 0.9% hafnium also results in a coating performance improvement. The 900 hour life is roughly a 30% improvement of the base line plasma spray composition. Adding 1.6% silicon to the basic NiCoCrAlY composition improves the coating life by about 70%, from about 700 hours to about 1200 hours.

In view of these results, it is not surprising that combinations of silicon and hafnium produce an additional increase in coating durability. What is surprising and unexpected is the degree of improvement. The coating composition with additions of 0.6% silicon and 0.7% hafnium displays substantially improved performance. Testing has not proceeded long enough to produce coating failure but it appears that the coating life will be at least 2200 hours and probably about 2500 hours. This performance is unexpected in view of the prior experience with silicon and hafnium alone. Since hafnium alone provides a 30% improvement in life and silicon alone provides a 70% improvement in life, it might be expected that a combination of silicon and hafnium would produce, at most, a 100% improvement in coating life. Instead, what is observed is a coating life improvement of more than 300%. In this connection, it should be noted that the amounts of silicon and hafnium added in the case of the invention are less than the amounts of silicon and hafnium which are added individually.

As shown in FIG. 1, the hafnium plus silicon modification to the NiCoCrAlY composition provides substantial benefits in extending coating life under conditions of cyclic oxidation. The exact reasons for the improvements are not well understood and we do not wish to be bound by any theory.

In addition to the cyclic oxidation testing previously described, the resistance of the invention coating to hot corrosion has also been evaluated. Hot corrosion occurs in gas turbine engines especially those that are operated near marine environments. It results from various salts which are present in the atmosphere and fuel, particularly sodium chloride. Hot corrosion occurs principally at intermediate temperatures. Consequently, the following testing cycle was used to determine the hot corrosion resistance of the subject coatings. The coated test bars were heated for two minutes at 1750° F. followed by two minutes at 2000° F. followed by two minutes of forced air cooling. The heating steps were performed using a flame produced by the combustion of jet fuel. To simulate a severe environment, 35 ppm of synthetic sea salt was added to the air. The results show the superiority of the invention coating. A vapor deposited coating of NiCoCrAlY composition protected a single crystal substrate of the previously described alloy for 202 hours before substrate attack. A standard aluminide protective coating protected the substrate for 120 hours. A vapor deposited NiCoCrAlY plus Si coating protected the substrate for 416 hours before failure. The invention coating, plasma sprayed NiCoCrAlY plus Si plus Hf has protected a substrate of the same material for 546 hours without failure and the invention coating showed no sign of being near failure. Thus, the invention coating has life which is at least two and a half times that of the standard commercially used vapor deposited NiCoCrAlY coating.

In most practical applications such as in gas turbines, the strains which result from thermal cycling can also contribute to coating degradation by causing coating cracking. For this reason, coating ductility is measured to ascertain the tendency for cracking. It has been found that ductility levels at 600° F. are indicative of whether coating cracking problems will be encountered during gas turbine engine exposure. Therefore, coated specimens were tensile tested at 600° F. to measure the strain needed to cause initial coating cracking. The addition of silicon to the basic MCrAlY coating (in the amount necessary to significantly improve oxidation resistance) reduced the ductility significantly. However, by adding hafnium, the amount of silicon needed was reduced, and the ductility was substantially increased.

The coatings of the present invention are particularly suited for the protection of gas turbine engine components. Such components are generally fabricated from nickel or cobalt base superalloys which may have been in either cast or wrought form. Nickel base superalloys are alloys based on nickel which are strengthened by the gamma prime phase ($Ni_3$ Al, Ti). With rare exception such superalloys also contain chromium in amounts from about 8 to about 20% and usually also contain from about 10 to about 20% cobalt. Refractory metal additions such as Mo, W, Ta and Cb may also be present. The cobalt base superalloys do not contain a single predominant strengthening phase but instead derive their strength from the presence of solid solution strengthening elements such as Mo, W, Ta, Cb and carbides which results from the presence of elements such as Cr, Ti and refractory metals. Of course, carbon is present in alloys which rely on carbide strengthening. Chromium is usually found in amounts of about 20% in cobalt superalloys.

The method of fabrication of the superalloys has little effect on its suitability for protection by the invention coatings. Cast superalloy articles including polycrystalline columnar grain and single crystal articles may all be protected, as may wrought articles for example, sheet metal components.

In the past, the MCrAlY compositions have been applied by an electron beam physical vapor deposition technique almost exclusively, especially in the context of coating gas turbine blades and vanes. The present invention composition would have substantial protective capabilities when applied by vapor deposition. However, vapor deposition of hafnium containing coatings is difficult because of the low vapor pressure of hafnium relative to the other coating constituents. Effective deposition of the hafnium containing coating would probably require the use of a dual source evaporation procedure in which one source would contain hafnium and the other source would contain the balance of the coating ingredients. Accordingly, we prefer the use of the plasma spray process. In particular, we prefer to use high energy plasma spraying in a chamber evacuated to low pressures.

The plasma sprayed coatings for which data are presented in FIG. 1 were produced using a low pressure chamber spray apparatus sold by the Electro Plasma Corporation (model 005). The apparatus includes a chamber in which the specimens were sprayed and this chamber was maintained with an argon atmosphere at the reduced pressure of about 50 mm Hg. The plasma spraying was conducted at 50 volts and 1520 amperes with 85% Ar-15% He arc gas. The powder feed rate was 0.3 lbs/minute of NiCoCrAlY+Si+Hf. Powder in the particle size range of 10 to 37 microns was employed and the coating thickness was about 5 mils.

We emphasize that the method of coating deposition is not particularly critical so long as a dense, uniform, continuous adherent coating of the desired composition results. Other coating deposition techniques such as sputtering may also be employed.

It should be understood that the invention is not limited to the particular embodiments shown and described herein, but that various changes and modifications may be made without departing from the spirit and scope of this novel concept as defined by the following claims.

We claim:

1. A gas turbine engine component which comprises a substrate selected from the group consisting of Ni and Co base superalloys having thereon a protective coating consisting essentially of 5–40% Cr, 8–35% Al, 0.1–2.0% Y, 1–7.0% Si and 0.1–2.0% Hf balance selected from the group consisting of Ni, Co and mixtures thereof.

2. A coated article as in claim 1 in which the superalloy substrate is a nickel base superalloy and in which the coating contains 15–25% Cr, 10–20% Al, up to 30% Co, balance essentially Ni.

3. A coated article as in claim 2 in which the coating contains 15–25% Co.

4. A coated article as in claim 1 in which the superalloy substrate is a cobalt base superalloy and in which the coating contains 15–35% Cr, 10–20% Al, up to 35% Ni, balance essentially Co.

5. A coated article as in claims 1, 2, 3, or 4, intended for use at temperatures in excess of about 2100° F., in which the Si content is limited to a maximum of 2%.

6. A coated article as in claims 1, 2, 3 or 4 in which the substrate is essentially free from hafnium and the coating contains at least 0.2% Hf.

* * * * *